United States Patent [19]

Heimstra

[11] 3,986,649

[45] Oct. 19, 1976

[54] SUSPENDED STORAGE DEVICE

[76] Inventor: Frederick A. Heimstra, 2550 S. Steele St., Denver, Colo. 80210

[22] Filed: Nov. 19, 1973

[21] Appl. No.: 417,075

[52] U.S. Cl. .......................... 224/42.46 B; 211/42; 211/88; 312/245
[51] Int. Cl.² .................................. B60R 7/04
[58] Field of Search ............. 224/42.42 R, 42.42 A, 224/42.46 R, 42.46 B, 42.45 R, 42.45 A, 29 R, 29 D; 248/450, 452, 453; 180/46; 211/86, 88, 50, 49 R, 42; 40/124; 312/245, 235 A; D6/184, 181, 18

[56] References Cited
UNITED STATES PATENTS

| 272,263 | 2/1883 | Kenyon | 248/95 X |
|---|---|---|---|
| 1,590,957 | 6/1926 | Schaffner | 312/245 X |
| 1,915,958 | 6/1933 | Skirrow | 211/88 UX |
| 2,104,523 | 1/1938 | Lichtenstein | 312/245 X |
| 2,584,646 | 2/1952 | Wagstaff | 224/42.42 R UX |
| 2,672,988 | 3/1954 | Johnson | 211/88 |
| 3,007,617 | 11/1961 | Mullin | 224/42.45 A X |
| 3,756,481 | 9/1973 | Schaefer | 224/42.46 B X |

Primary Examiner—Robert J. Spar
Assistant Examiner—Jerold M. Forsberg
Attorney, Agent, or Firm—John E. Reilly

[57] ABSTRACT

A storage bin for loose articles of various sizes is adapted to be mounted on a vehicle seat or other substantially upright support. The storage bin supports flat or elongated articles, such as magazines in a passage in the storage bin, and other articles can be stored within compartments in the storage bin.

13 Claims, 4 Drawing Figures

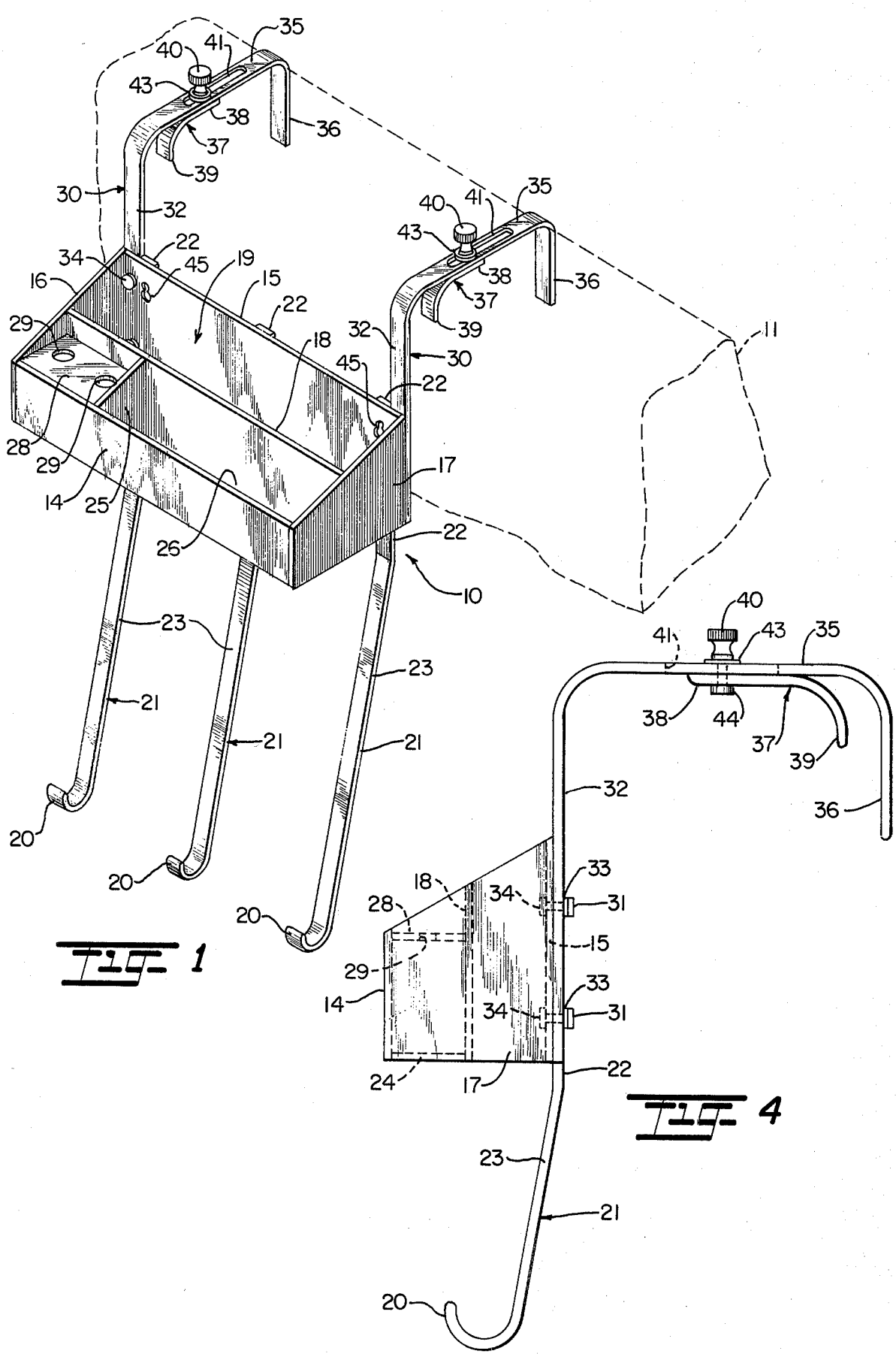

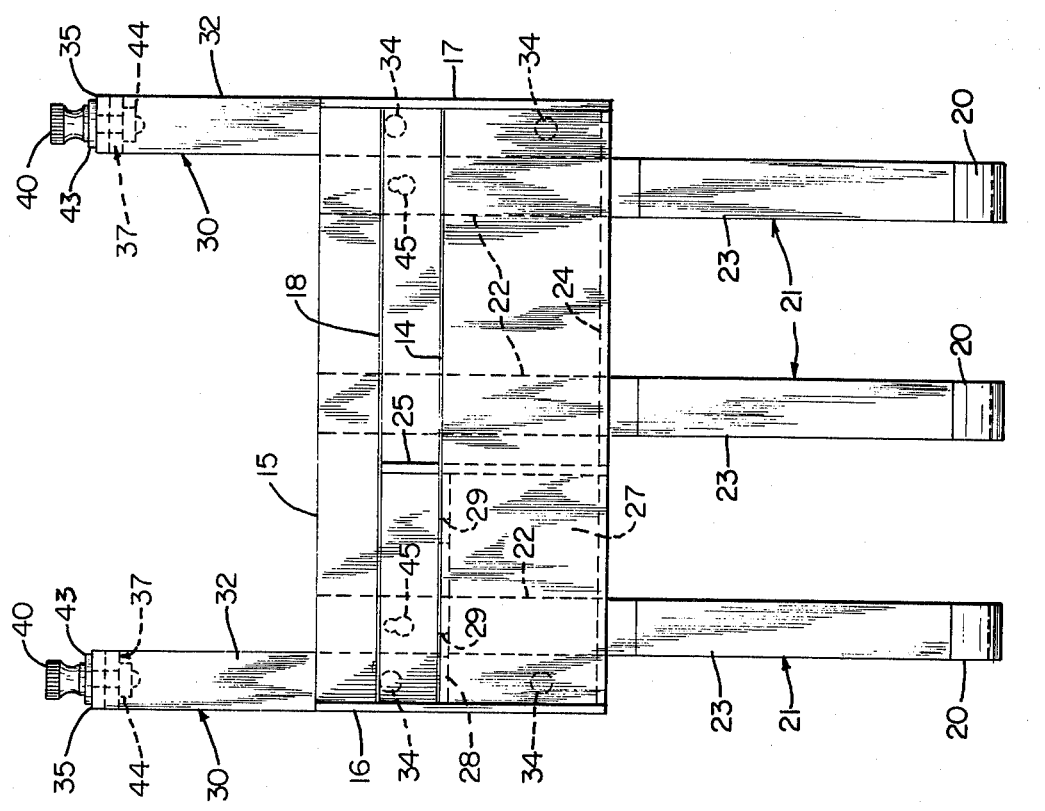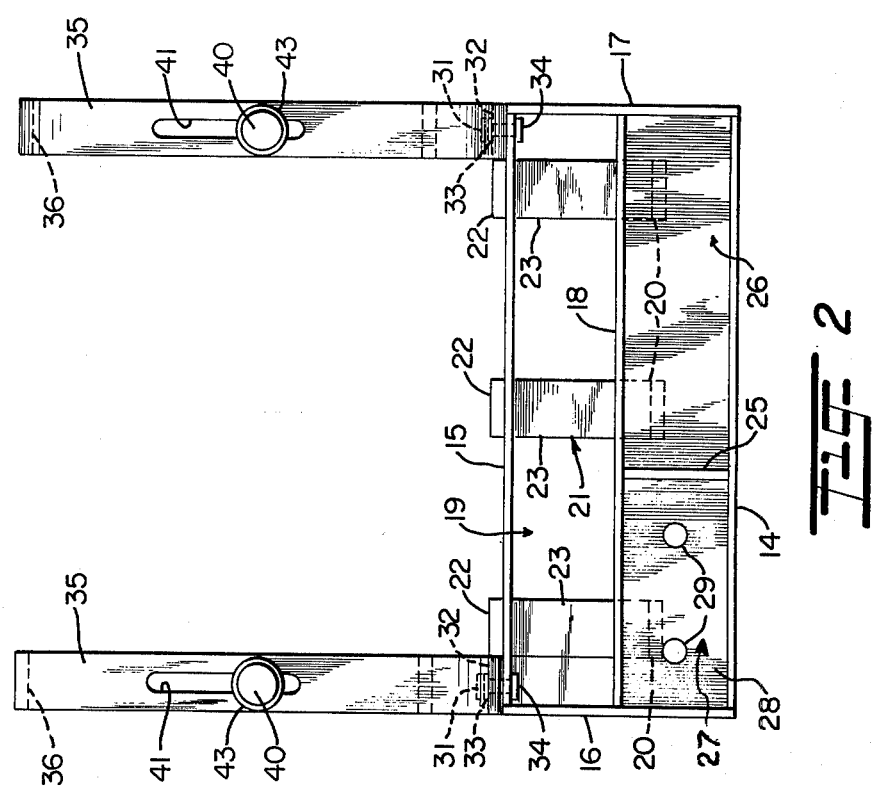

SUSPENDED STORAGE DEVICE

When traveling in an automobile, loose articles tend to become scattered within the passenger compartment. When one is traveling alone, loose articles, which may be desired at various times, can become inaccessible on the front seat. For example, maps can overlie other articles so that it can become difficult for the driver to locate a desired loose article.

When children are traveling, the problem of loose articles being scattered throughout the passenger compartment increases. To amuse children during trips, various types of books and magazines may be taken along with pens, pencils, and crayons, for example, to color a book.

During the course of the trip, these loose articles can become scattered throughout the passenger compartment so that a child cannot find a particular article. This can become a very distracting problem for the driver.

While various types of storage bins for vehicles have been previously suggested, these have not been capable of providing an arrangement in which easy access can be had to various sizes of loose articles. U.S. Pat. No. 2,932,544 to Lambert, for example, discloses a horizontally disposed storage tray supported in the rear passenger compartment of a vehicle. However, this tray does not have separate compartments for various sizes of loose articles nor does it provide an arrangement in which easy access to elongated articles such as books and magazines, for example, can be obtained. Instead, the magazines would have to be disposed on top of each other on the tray.

U.S. Pat. No. 3,014,759 to Bing shows a utility bag for a vehicle in which large vertically disposed compartments are provided, but has the disadvantage of requiring a complicated mounting arrangement. The Bing patent also has too large compartment sizes to provide ready access to relatively small articles.

The present invention satisfactorily solves the foregoing and other problems by providing a storage bin in which various sized loose articles, which may be taken on a trip in an automobile, are readily stored for easy access. Thus, the storage bin of the present invention stores magazines, books, pens, pencils, crayons, and other loose articles of various sizes for easy access by the passengers.

The present invention utilizes a storage bin which can be supported on the front seat of the vehicle so that the storage bin is disposed in front of the front seat or in back of the front seat. Thus, this enables one to position the storage bin in the portion of the automobile in which access is desired. For example, if children are riding in the back seat, then the storage bin would be mounted so that the storage bin is disposed in the rear compartment of the vehicle. If only the driver is riding in the vehicle, then the storage bin would be mounted for disposition in the front passenger compartment of the vehicle.

In addition to being particularly useful for storing loose articles in a passenger compartment of a vehicle, the storage bin of the present invention also can be readily mounted on other substantially upright supports, such as, on a wall in a house, or on a chair.

It is therefore an object of this invention to provide a novel and improved storage bin for loose articles of various sizes.

Another object of this invention is to provide a low-cost storage bin that is readily usable in either a vehicle or a home.

A further object of the present invention is to provide a storage bin which is conformable for removable mounting on various upright supports and is capable of adjustable, snug-fitting engagement with supports of different widths.

This invention relates to a storage bin for mounting on a substantially upright support, such as, an automobile seat. The storage bin includes a front wall, a rear wall, and side walls secured to the front and rear walls. A divider wall extends between the side walls and intermediate the front and rear walls to form a rear storage compartment having an open passageway between the rear wall, the side walls, and the divider wall to receive books, magazines, and the like. At least one of the walls has bracket means secured thereto including upper, spaced hangers which can be adjusted to conform to the width of the support and article supporting means extending downwardly therefrom to support the bottom edge of any book, magazine, and the like disposed within the passage. A bottom wall is disposed between the divider wall, the front wall, and the side walls to form at least one receptacle or front storage compartment.

The above and other objects, advantages and features of the present invention will become more readily appreciated and understood from a consideration of the following detailed description when taken together with the accompanying drawings, in which:

FIG. 1 is a perspective view of a preferred form of the storage bin of the present invention mounted on a vehicle seat;

FIG. 2 is a top plan view of the storage bin of FIG. 1;

FIG. 3 is a front elevational view of the storage bin of FIG. 1; and

FIG. 4 is a side elevational view of the storage bin of FIG. 1.

Referring to the drawings and particularly FIG. 1, there is shown a storage bin 10 adapted for mounting on the front seat 11 of an automobile. The storage bin 10 can be mounted on the seat 11 so that the storage bin is disposed facing forwardly and within the front passenger compartment or facing rearwardly within the rear passenger compartment.

The storage bin 10 includes a front wall 14, a rear wall 15, and opposite side walls 16 and 17. The walls 14, 15, 16 and 17, which are suitably formed of commercially available materials, such as plastic or wood, are secured to each other by suitable fastener means as well as gluing the walls 14–17 to each other. The side walls 16 and 17 are preferably substantially parallel to each other, substantially perpendicular to the front wall 14, and the rear wall 15, and the upper edges of the side walls 16 and 17 are inclined upwardly from the front wall 14 toward the rear wall 15.

A divider wall 18, which is preferably formed of the same material as the walls 14–17, extends between the side walls 16 and 17 intermediately of the front wall 14 and the rear wall 15 to divide the bin into front and rear storage compartments. The divider wall 18, which is preferably substantially parallel to the front wall 14 and the rear wall 15, is spaced from the rear wall 15 to form a rear storage compartment defining a generally rectangular-shaped passage 19, as shown in FIG. 2, to enable elongated articles, such as, books and magazines, to be disposed therein.

The books and magazines, which are disposed within the passage 19 of the storage bin 10, have their lower edges supported by curved bottom ends 20 which curve forwardly and upwardly from the lower ends of retaining arms 21, so as to form generally U-shaped return portions at the lower extremities to securely retain the lower edges of the articles in place.

The retaining arms 21 preferably are secured to the rear wall 15 of the storage bin 10 and extend downwardly from the upper surface of the rear wall 15. As further shown in FIG. 4, each of the retaining arms 21 includes an upper straight portion 22, which is secured to the rear wall 15 of the storage bin 10 by suitable fasteners or glue, and an intermediate portion 23 extending at an angle from the portion 22 to position the curved bottom end 20 of the retaining arm 21 beneath the passage 19 of the storage bin 10 so that a book or magazine, for example, can be readily supported while disposed in the passage 19.

A bottom wall 24, which in FIGS. 3 and 4, is preferably formed of the same material as the walls 14–17 and extends between the bottoms of the side walls 16 and 17, the bottom of the front wall 14, and the bottom of the divider wall 18 to form a floor for a portion of the storage bin 10. This provides at least one receptacle in the front portion of the storage bin 10.

A second divider wall 25, shown in FIGS. 1–3, is preferably formed of the same material as the walls 14–17, and is disposed substantially perpendicular to the front wall 14 and the divider wall 18 to divide the receptacle into a first compartment or receptacle 26 and a second compartment or receptacle 27. The second divided wall 25 is secured to the walls 14, 24 and 18 by suitable means such as glue, for example.

The second compartment or receptacle 27 has a cover or closure 28, preferably formed of the same material as the walls 14–17, which extends between the front wall 14, the divider wall 18, the second divider wall 25, and the side wall 16 and secured thereto by suitable means such as glue. The closure 28 forms a cover for the second compartment or receptacle 27 and has holes 29 extending therethrough to receive smaller articles, such as, pens, pencils, or crayons.

The storage bin 10 is supported on the vehicle seat 11 by a pair of hanger arms 30, which are preferably formed of the same material as the retaining arms 21, and for example, may be composed of a high-strength plastic or metal. As shown in FIGS. 1–3, the hanger arms 30 are disposed outside of the two outermost retaining arms 21.

Each of the hanger arms 30 is secured or releasably connected to the rear wall 15 of the storage bin 10. Preferably, the securing means for connecting each of the hanger arms 30 to the storage bin 10 is defined by a screw 31, as shown in FIGS. 2 and 4, extending through an opening in the rear wall 15 and a straight portion 32 of the hanger arm 30. Each of the screws 31 has a rubber washer 33 and a nut 34 cooperating therewith to releasably connect each of the hanger arms 30 to the rear wall 15 of the storage bin 10.

The straight portion 32, which extends from the bottom of the top rear wall 15 of each of the hanger arms 30, extends upwardly beyond the top of the rear wall 15 and has a substantially horizontal portion 35 extending substantially perpendicular to the straight portion 32. Each of the hanger arms 30 has a downwardly depending portion 36 extending substantially perpendicular to the substantially horizontal portion 35 and is disposed substantially parallel to the portion 32 of the hanger arm 30. The portion 36 is adapted to engage one side of the vehicle seat 11 as shown in FIG. 1.

Each of the hanger arms 30 has an adjusting arm 37 supported thereon. Each of the adjusting arms 37 includes a first portion 38 which is substantially parallel to the substantially horizontal portion 35 of the hanger arm 30, and a second portion 39 extending substantially perpendicular to the first portion 38 and downwardly therefrom.

The first portion 38 of the adjusting arm 37 is adjustably secured to the substantially horizontal portion 35 of the hanger arm 30 by a screw 40 extending through a washer 43 and longitudinal slot 41 in the portion 35 of the hanger arm 30 and a hole in the portion 38 of the adjusting arm 37. A nut 44 locks the adjusting arm 37 in the position to which it is moved along the substantially horizontal portion 35 of the hanger arm 30. Normally, as shown in FIG. 1, the adjusting arm 37 is disposed so that the second portion 39 of the adjusting arm 37 engages the opposite side of the vehicle seat 11 from that engaged by the depending portion 36 of the hanger arm 30. In the alternative, the arm 37 may be reversed as shown in FIG. 4, and adjustably connected in the same manner.

As shown in FIG. 3, each of the outermost retaining arms 21 and the rear wall 15 of the storage bin 10 has a keyhole slot 45 formed therein in substantially the same horizontal plane as that in which the upper portion of the screws 31 releasably connect the hanger arms 30 to the rear wall 15 of the storage bin 10 as shown in FIG. 3. Accordingly, the keyhole slots 45 allow the storage bin 10 to be supported on a wall panel by nails, for example, whenever the hanger arms 30 are disconnected from the rear wall 15 of the storage bin 10.

Considering the use of the storage bin 10 of the present invention, the hanger arms 30 are connected to the storage bin 10 when it is to be mounted on the vehicle seat 11. After the hanger arms 30 are disposed on the vehicle seat 11 so that each of the portions 36 engages one side of the seat 11, the adjusting arms 37 are adjusted so that the portion 39 of each of the adjusting arms 37 engages the other side of the seat 11 and serves to releasably mount the storage bin 10 on the vehicle seat 11.

An elongated article such as a book or magazine can then easily be disposed in the passage 19 and supported on the curved bottom ends 20 of the retaining arms 21. Pens, pencils, or crayons can be placed in the holes 29 in the wall 28. Other loose articles can be supported in the first compartment or receptacle 26. Thus, the storage bin 10 provides easy access to each magazine or book supported in the passage 19, to any pen, pencil, or crayon supported in the second compartment or receptacle 27, and to any other loose article disposed in the first compartment or receptacle 26.

Although each of the side walls 16 and 17 are shown as inclining from the front wall 14 upwardly toward the rear wall 15 with the divider wall 18 having a lesser height then the rear wall 15, it should be understood that such is not a requisite for the storage bin 10. All of the walls 14, 15 and 18 could be the same height and the side walls 16 and 17 not be inclined. Likewise, while the wall 28 has been shown as only having two of the holes 29 therein, it should be understood that any number of the holes 29 could be formed in the wall 28.

While there has been shown only the first compartment or receptacle 26 for holding loose articles, it should be understood that the first compartment or receptacle 26 could be divided into a plurality of compartments or receptacles by additional divider walls like the second divider wall 25. Furthermore, the side walls 16 and 17 could be longer so that the front wall 14 would be another divider wall whereby further additional compartments could be provided in front of the present front wall 14 by having another front wall so that the storage bin 10 would have additional compartments if such were desired.

While the retaining arms 21 have been shown and described as being supported from the rear wall 15 of the storage bin 10, it should be understood that such is not a requisite. Thus, the retaining arms 21 could be supported on the divider wall 18 or on the side walls 16 and 17, if desired; and it should be understood that the retaining arms 21 may be bent forwardly to assume a different configuration than that shown to provide the desired support to the bottom edge of any elongated article disposed within the passage 19 of the storage bin 10.

While the hanger arms 30 have been shown as being releasably connected to the rear wall 15 of the storage bin 10, it should be understood that such is not necessary. For example, the hanger arms 30 could be releasably connected to the side walls 16 and 17 although the hanger arms 30 would have to have a slightly different configuration.

An advantage of this invention is that it provides ready access to any stored article. Another advantage of this invention is that it prevents clutter of the passenger compartment of an automobile by loose articles. A further advantage of this invention is that it can be used in both a car and a house for storing articles. Still another advantage of this invention is its relatively low cost.

For purposes of exemplification, a particular embodiment of the invention has been shown and described according to the best present understanding thereof. However, it will be apparent that changes and modifications in the arrangement and construction of the parts thereof may be restored to without departing from the spirit and scope of the invention.

What is claimed is:

1. A storage bin adapted for mounting on a substantially upright support comprising:
   a front wall, a rear wall, and side walls secured to said front and rear walls;
   a divider wall extending between said side walls and intermediate said front and rear walls to form an open passage extending through said bin between said rear wall, said side walls, and said divider wall;
   a plurality of spaced support means secured to at least one of said walls and extending downwardly below said walls to a position spaced beneath said open passage cooperating with the passage formed by said walls for supporting articles disposed within the open passage;
   a bottom wall disposed between said divider wall, said front wall, and said side walls to form at least one receptacle; and
   mounting means extending upwardly from said storage bin to mount said storage bin on the support.

2. The storage bin according to claim 1 in which said support means is secured to said rear wall for downward extension therefrom.

3. The storage bin according to claim 2 in which said mounting means includes connecting means connected to at least one of said walls to mount said storage bin on the upright portion of a car seat or the like.

4. The storage bin according to claim 3 in which said connecting means of said mounting means is connected to said rear wall.

5. The storage bin according to claim 4 in which said connecting means of said mounting means includes:
   a pair of hanger arms; and
   means releasably connecting each of said hanger arms to said rear wall.

6. The storage bin according to claim 5 in which each of said hanger arms includes:
   a first portion releasably connected to said rear wall by said releasable connecting means and extending upwardly from said rear wall;
   a second portion extending substantially perpendicular to said first portion; and
   a third portion extending downwardly from said second portion and substantially parallel to said first portion, said third portion being spaced from said first portion to engage one side of a vehicle seat that forms the support for said storage bin;
   a second arm supported on said second portion of each said hanger arms, each of said second arms including first and second portions disposed at an angle to each other;
   means adjustably connecting said first portion of said second arm to said second portion of said hanger arm; and
   said second portion of said second arm is disposed substantially parallel to said third portion of said hanger arm and spaced therefrom to engage the other side of the vehicle seat.

7. The storage bin according to claim 6 in which:
   said support means comprises a plurality of arms; and
   each of said arms of said support means includes means to support the bottom edge of an article disposed within the passage.

8. The storage bin according to claim 7 in which:
   each of said arms of said support means is secured to said rear wall; and
   said mounting means includes means formed in each of said arms of said support means and said rear wall to receive a nail or the like on a wall on which said storage bin is to be mounted.

9. The storage bin according to claim 2 in which:
   said support means comprises a plurality of arms; and
   each of said arms of said support means includes means spaced vertically beneath said open passage to support the bottom edge of an article disposed within and extending downwardly through the passage.

10. The storage bin according to claim 9 in which:
    each of said arms of said support means is secured to said rear wall; and
    said mounting means includes means formed in each of said arms of said support means and said rear wall to receive a nail or the like on a wall on which said storage bin is to be mounted.

11. A storage bin adapted for releasable mounting on an automobile seat and the like comprising:
    a storage compartment having a rear wall, side wall portions extending forwardly from opposite sides of said rear wall and at least one front wall portion extending between said side wall portions in spaced parallel relation to said rear wall, said wall portions forming an open passageway therethrough;

bracket means on said storage compartment including at least one hanger extending upwardly from said rear wall portion and adapted for mounting on the upper edge of an automobile seat; and a plurality of spaced elongated article support means mounted on said storage compartment extending downwardly from said rear wall portion and beneath said storage compartment and terminating in a forwardly directed, curved bottom end in the form of a generally U-shaped return member spaced vertically beneath said open passage way, said article supporting means cooperating with the passageway formed by said wall portions for retention of elongated articles inserted through said open passageway.

12. A storage bin according to claim 11, wherein said bracket means includes a plurality of upwardly extending hangers releasably secured to the rear surface of said rear wall portions, and said article support means includes a plurality of downwardly extending retainer arms, each retainer arm terminating in a return member spaced below said storage compartment.

13. A storage bin according to claim 11, said storage bin including divider means between said front and rear walls dividing said bin into front and rear storage compartments, and a bottom wall portion affixed to said side and front wall portions to close the lower end of said front storage compartment.

* * * * *